(12) United States Patent
Nakatsuji et al.

(10) Patent No.: US 10,752,049 B2
(45) Date of Patent: Aug. 25, 2020

(54) WHEEL BEARING DEVICE

(71) Applicant: NTN Corporation, Osaka-shi (JP)

(72) Inventors: Yuta Nakatsuji, Iwata (JP); Hiroto Suma, Iwata (JP)

(73) Assignee: NTN Corporation, Osaka-shi (JP)

( * ) Notice: Subject to any disclaimer, the term of this patent is extended or adjusted under 35 U.S.C. 154(b) by 311 days.

(21) Appl. No.: 15/700,406

(22) Filed: Sep. 11, 2017

(65) Prior Publication Data

US 2017/0368873 A1 Dec. 28, 2017

Related U.S. Application Data

(63) Continuation of application No. PCT/JP2016/057655, filed on Mar. 10, 2016.

(30) Foreign Application Priority Data

Mar. 11, 2015 (JP) .................. 2015-047897

(51) Int. Cl.
*B60B 27/00* (2006.01)
*F16C 33/58* (2006.01)
*F16C 35/06* (2006.01)

(52) U.S. Cl.
CPC .......... *B60B 27/00* (2013.01); *B60B 27/0078* (2013.01); *B60B 27/0094* (2013.01); *F16C 33/581* (2013.01); *F16C 33/586* (2013.01); *F16C 35/06* (2013.01); *B60B 27/0005* (2013.01); *B60B 2900/111* (2013.01); *B60B 2900/311* (2013.01); *F16C 2226/60* (2013.01); *F16C 2326/02* (2013.01)

(58) Field of Classification Search
CPC . B60B 27/00; B60B 27/0005; B60B 27/0078; B60B 27/0084; B60B 27/0094
See application file for complete search history.

(56) References Cited

U.S. PATENT DOCUMENTS 6,523,909 B1 * 2/2003 Nakamura ................ B60B 3/04
188/18 A
8,313,245 B2 * 11/2012 Norimatsu ................ B60B 7/00
384/480

(Continued)

FOREIGN PATENT DOCUMENTS

JP 2007-071352 3/2007
JP 2007-126087 5/2007

(Continued)

*Primary Examiner* — Jason R Bellinger
(74) *Attorney, Agent, or Firm* — Harness, Dickey & Pierce, P.L.C.

(57) ABSTRACT

A wheel bearing device has a vehicle-body-mounting flange 5b with a plurality of ears 10 discontinuously formed in a circumferential direction on an outer circumferential surface of the outer member 5. An outer circumferential surface 11 on the outer side of the outer member is tapered and formed such that a diameter of the outer member gradually decreases in a direction to an outer side. Ridges 16 protrude from a fitting surface 12 toward the outside in a radial direction. The ridges 16 are formed between the plurality of ears 10. The ridges 16 are forged to smoothly connect to the outer circumferential surfaces of the plurality of ears 10. Ribs 15 are forged on inner-side outer circumferential surfaces of the plurality of ears 10.

4 Claims, 4 Drawing Sheets

(56) References Cited

U.S. PATENT DOCUMENTS

| | | | | |
|---|---|---|---|---|
| 2002/0006239 | A1* | 1/2002 | Toda | B60B 27/00 384/537 |
| 2005/0248213 | A1* | 11/2005 | Grabaum | B60B 27/00 301/105.1 |
| 2007/0269155 | A1* | 11/2007 | Mori | B60B 27/00 384/544 |
| 2009/0046970 | A1* | 2/2009 | Kawamura | B60B 27/0005 384/544 |
| 2013/0300187 | A1* | 11/2013 | Konrad | B60B 27/0005 301/105.1 |

FOREIGN PATENT DOCUMENTS

| | | |
|---|---|---|
| JP | 5242957 | 7/2013 |
| JP | 2014-156197 | 8/2014 |

* cited by examiner

[Fig 1]
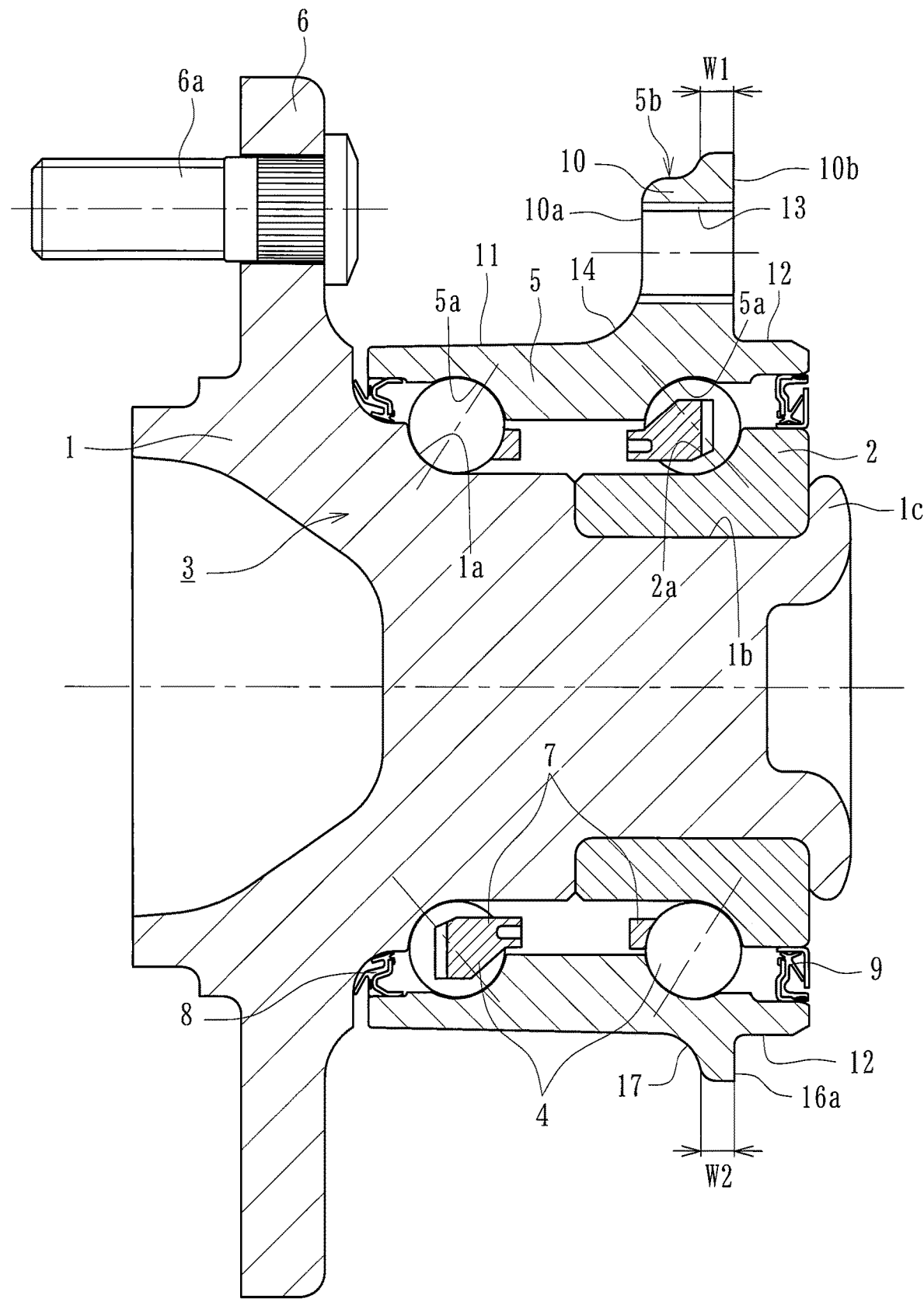

[Fig 2]
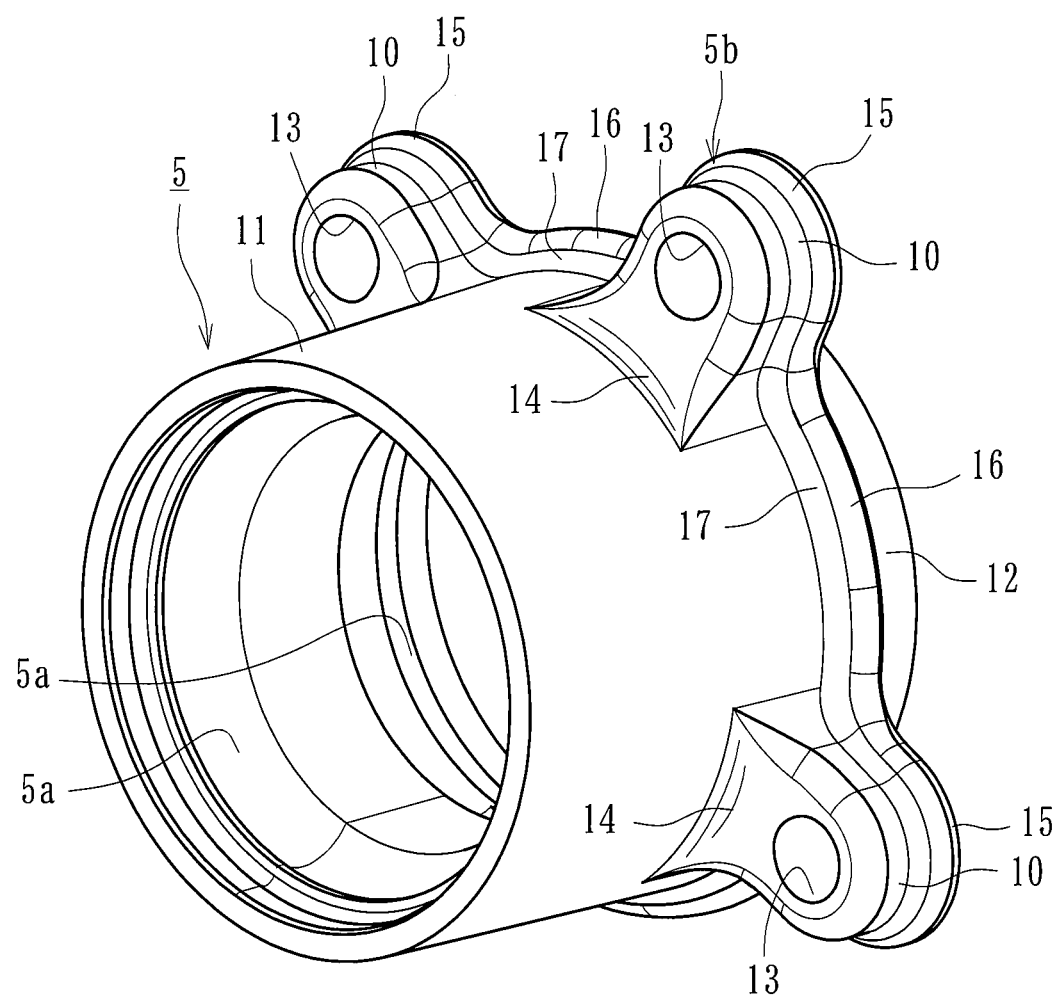

[Fig 3]
PRIOR ART
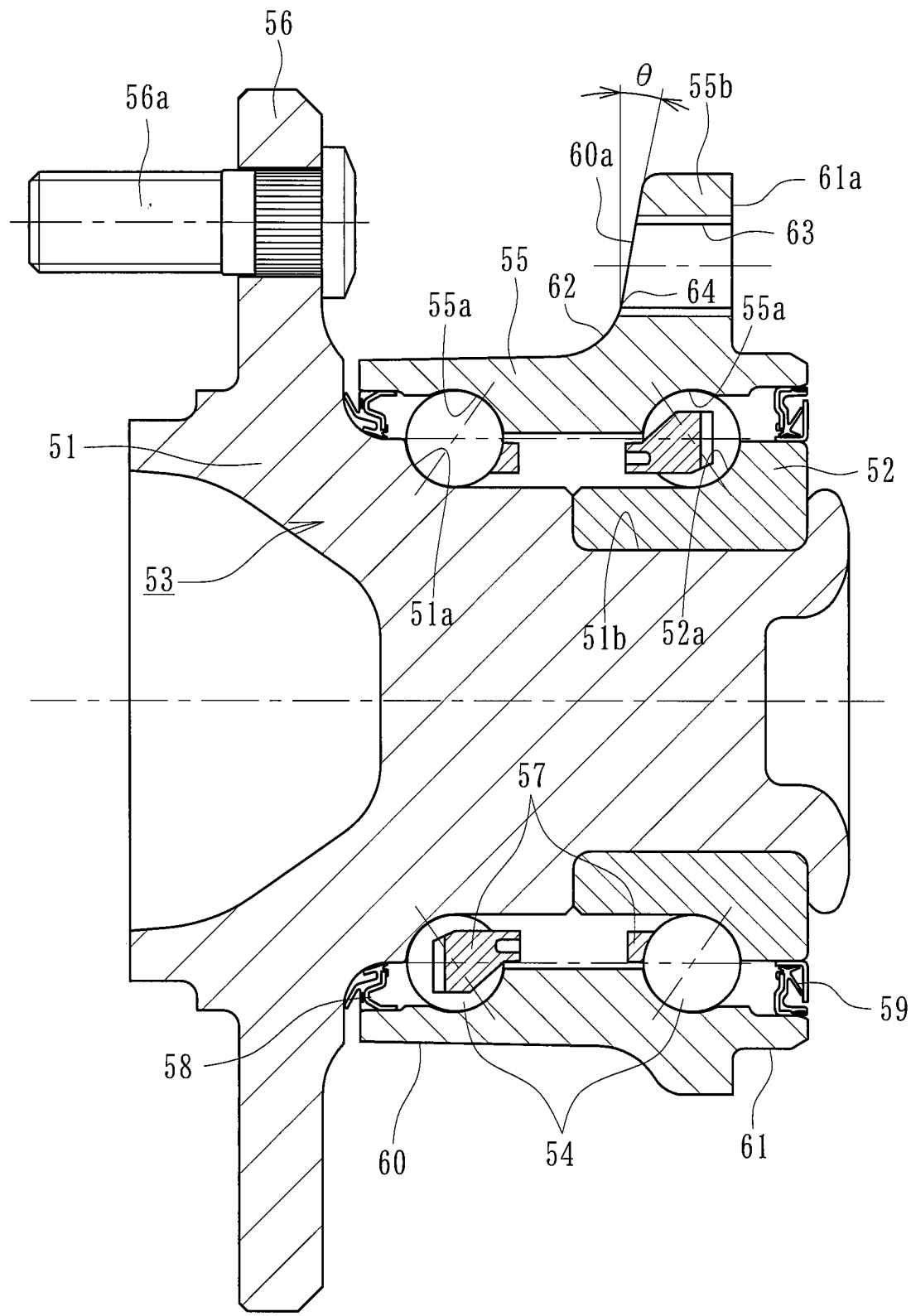

[Fig 4]
PRIOR ART
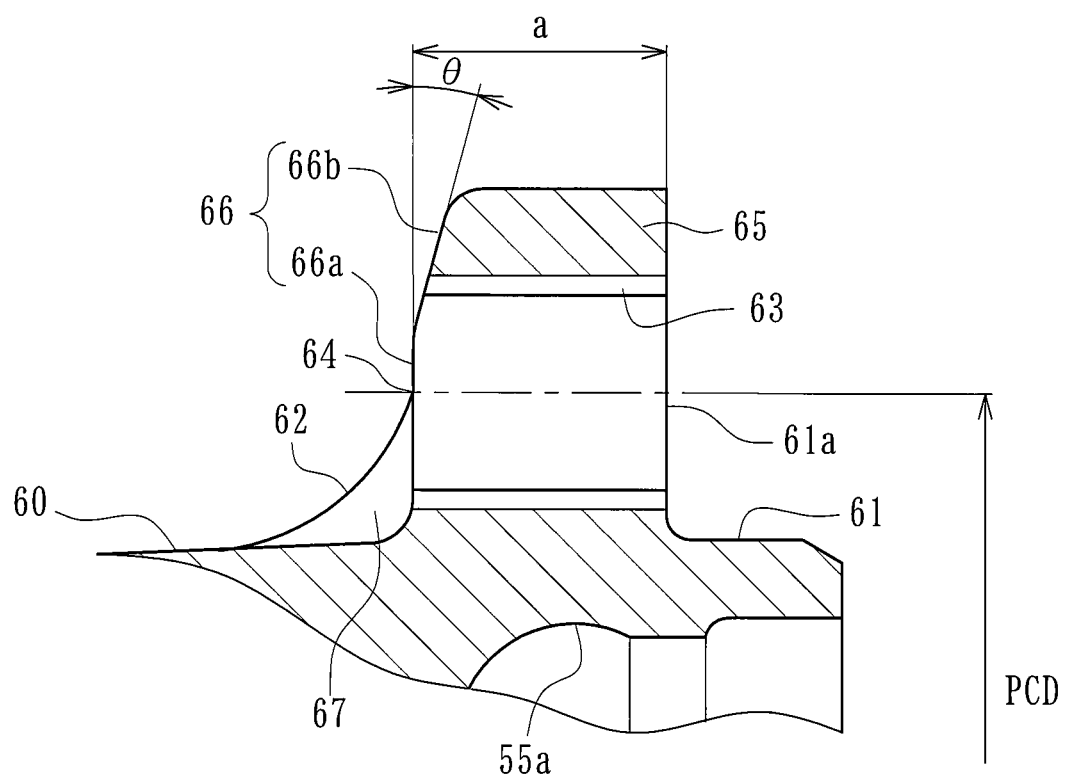

WHEEL BEARING DEVICE

CROSS-REFERENCE TO RELATED APPLICATIONS

This application is a continuation of International Application No. PCT/JP2016/057655, filed Mar. 10, 2016, which claims priority to Japanese Application No. 2015-047897, filed Mar. 11, 2015. The disclosures of the above applications are incorporating herein by reference.

FIELD

The present disclosure relates to an automobile wheel bearing device that rotatably bears a wheel, and more particularly, to a wheel bearing device that includes an outer member with a reduced weight.

BACKGROUND

Conventionally, automobile wheel bearing devices support wheels that rotatably bear wheel hubs that mount the wheels by using rolling bearings. They are used for driving wheels or driven wheels. For structural reasons, inner-ring rotation systems are typically used for driving wheels. The inner ring rotation systems and outer-ring rotation systems are typically used for driven wheels. Double-row angular contact ball bearings, that have desired bearing stiffness, achieve sufficient durability against misalignment. Also, they have a small rotational torque to improve fuel consumption. Thus, they are frequently used for the wheel bearing devices.

The structures of wheel bearing devices are classified broadly into four generations. A first-generation structure includes a wheel bearing with a double-row angular contact ball bearing fit between a knuckle of a suspension and a wheel hub. A second-generation structure includes a vehicle-body-mounting flange or a wheel-mounting flange directly formed on the outer circumference of an outer member. A third-generation structure includes which an inner raceway surface directly formed on the outer circumference of a wheel hub. A fourth-generation structure has inner raceway surfaces directly formed on the outer circumference of a wheel hub and the outer circumference of an outer joint member of a constant-velocity universal joint.

The structure illustrated in FIG. 3 is known as an example of the structure of such a wheel bearing device. This wheel bearing device is referred to as a third-generation wheel bearing device on a driven wheel side. It includes an inner member 53 formed from a wheel hub 51 and an inner ring 52. An outer member 55 is mounted around the inner member 53 with double-row balls 54 interposed between the two. In the following description, where the wheel bearing device is assembled on the vehicle, the outside of a vehicle is referred to as an outer side (left-hand side in FIG. 3). A central side of the vehicle is referred to as an inner side (right-hand side in FIG. 3).

The wheel hub 51 includes a wheel-mounting flange 56. The flange 56 mounts a wheel (not illustrated). The wheel mounting flange 56 is integrally formed on an outer-side end portion. Hub bolts 56a are inserted into the wheel-mounting flange 56 at regular intervals about its circumference. An outer-side inner raceway surface 51a and a cylindrical portion 51b are formed on an outer circumference on the wheel hub 51. The cylindrical portion 51b extends axially from the inner raceway surface 51a. The inner ring 52 is press-fit on the cylindrical portion 51b. The inner ring 52 has an inner-side inner raceway surface 52a formed on its outer circumference.

The outer member 55 includes a vehicle-body-mounting flange 55b that is to be mounted onto a knuckle (not illustrated). The flange 55b is integrally formed on an outer circumference of the outer member 55. Double-row outer raceway surfaces 55a are integrally formed on an inner circumference of the outer member 55. The double-row balls 54, retained by cages 57, are rollably accommodated between the outer raceway surfaces 55a and the double-row inner raceway surfaces 51a and 52a that face the outer raceway surfaces 55a. Seals 58 and 59 are attached to both end portions of the outer member 55. The seals prevent lubricating grease sealed inside the bearing, from leaking out. Additionally, the seals prevent, for example, rainwater and dust from entering into the inside of the bearing from the outside.

The outer member 55 has a slightly inclined outer circumferential surface 60 formed on the outer side. A cylindrical fitting surface 61 is formed on the inner side. The fitting surface 61 is to be fit into the knuckle. The vehicle-body-mounting flange 55b is interposed between the outer circumferential surface 60 and the fitting surface 61. A large-arc-shaped corner 62 is formed by a forging process. The corner 62 is formed at a portion where the vehicle-body-mounting flange 55b meets the outer circumferential surface 60. The outer member vehicle-body-mounting flange 55b is discontinuously formed in a circumferential direction. Protruding portions have a tapped hole 63. The outer member 55 is to be fastened to the knuckle by fastening bolts, not illustrated.

An inner-side flange surface 61a of the vehicle-body-mounting flange 55b is formed into a flat vertical surface by a machining process such as a turning process. An outer-side flange surface 60a is formed by a forging process. It has a flat surface tapered at an inclination angle $\theta$ such that the thickness (a) of a flange base 64 gradually decreases in the direction to the outside in the radial direction. This enables the weight and size of the outer member 55 to be reduced without decreasing its strength and stiffness. Also, it makes it easy for material to reach an end portion of the vehicle-body-mounting flange 55b during a forging process. Thus, forging workability and processability is improved. The amount of a burr created during the forging process can be decreased. The precision can be improved, and the lifetime of a mold can also be improved.

In the conventional outer member 55, the outer-side flange surface 60a is formed into a flat surface tapered at an inclination angle $\theta$. Accordingly, it is difficult to drill a pilot hole to form the tapped hole 63. For this reason, as illustrated in FIG. 4, an outer-side flange surface 66 of a vehicle-body-mounting flange 65 is formed as a flat vertical surface 66a by a forging process. It extends from the flange base 64 toward the outside in the radial direction. A flat surface 66b is tapered at a predetermined inclination angle $\theta$. It is formed such that the thickness of the vehicle-body-mounting flange 65 gradually decreases in the direction to the outside in the radial direction. Spot-facing is performed on the root of the vehicle-body-mounting flange 65 at a position corresponding to the tapped hole 63. A recessed portion 67, extending in the axial direction, is formed on the corner 62.

The recessed portion 67 is formed by a cutting process with a milling machine. Subsequently, the pilot hole is formed by a drilling process. A tapping process is performed in the pilot hole to form the tapped hole 63. This prevents processes of forming the pilot hole and the tapped hole 63 from being disturbed even in the case where the tapped hole 63 is formed such that the PCD of the tapped hole 63 is decreased and a part is connected to the recessed portion 67. Accordingly, the PCD of the tapped hole 63 can be dramatically decreased. Thus, the weight and size of the outer member can be further reduced without decreasing the strength and stiffness of the outer member. See, Japanese Patent No. 5242957.

SUMMARY

However, the conventional outer member 55 not only has a problem of increased cost, due to the spot facing process, but also a problem in that an increased stress is present at the recessed portion 67 at the corner 62 where a large moment load is applied to the outer member 55. In recent years, there has been a strong demand for improved fuel consumption in view of, for example, resource saving and pollution. Thus, there is a need to reduce the weight of the above type of wheel bearing devices in order to improve fuel consumption. In addition to the reduction in weight, the use of an aluminum alloy knuckle increases. In some cases, customers request that the outer diameter of the vehicle-body-mounting flange 65 is increased. This decreases the pressure of the inner-side flange surface 61*a* that corresponds to a contact surface of the vehicle-body-mounting flange 65 with the knuckle. In the case of the conventional outer member 55, an increase in the outer diameter increases the weight. The reduction in the weight of the outer member 55 is limited.

The present disclosure overcomes the deficiencies of the prior art. It is an object of the present disclosure to provide a wheel bearing device with an outer member having a reduced weight without decreasing strength and stiffness of the outer member at a reduced cost. The protruding ears of the vehicle-body-mounting flange are discontinuously formed in the circumferential direction of the outer member. Each ear has a rib structure.

To achieve the object according to the disclosure, a wheel bearing device comprises an outer member including a vehicle-body-mounting flange integrally formed on its outer circumference. The vehicle-body-mounting flange is to be mounted to a knuckle of a suspension. Double-row outer raceway surfaces are integrally formed on an inner circumference of the outer member. An inner member outer circumference has double-row inner raceway surfaces that face the double-row outer raceway surfaces. Double-row rolling elements are rollably accommodated between the raceway surfaces of the inner member and the outer member. A plurality of tapped holes, to receive fastening bolts, is formed in the vehicle-body-mounting flange. The vehicle-body-mounting flange is formed with a plurality of discontinuous ears formed in a circumferential direction on an outer circumferential surface of the outer member. The ears protrude toward the outside in a radial direction. The outer circumferential surface on the outer side is tapered and formed such that a diameter of the outer member gradually decreases in a direction to an outer side of the outer member. A cylindrical fitting surface, to be fit into the knuckle, is formed on an inner side. The plurality of ears is interposed between the outer circumferential surface and the fitting surface. Ribs are formed on inner-side outer circumferential surfaces of the plurality of ears by a forging process.

Wheel bearing devices with second- to fourth-generation structures have outer members that include integrally formed vehicle-body-mounting flanges on their outer circumference. The flange is to be mounted to the knuckle. The vehicle-body-mounting flange is formed with a plurality of discontinuous ears in the circumferential direction on the outer circumferential surface of the outer member. The ears protrude toward the outside in the radial direction. The outer circumferential surface on the outer side is tapered. Thus, the diameter of the outer member gradually decreases in the direction to the outer side of the outer member. The cylindrical fitting surface, to be fit into the knuckle, is formed on the inner side of the outer member. The plurality of ears is interposed between the outer circumferential surface and the fitting surface. The ribs are formed, by a forging process, on the inner-side outer circumferential surfaces of the plurality of ears. Accordingly, the weight of the outer member can be reduced without changing the length of the tapped holes and the area of contact between the inner-side side surface of the ears and the knuckle. The number of cutting processes is decreased to a minimum. The wheel bearing device can be provided at a reduced cost.

Ridges that protrude from the fitting surface are formed between the plurality of ears on the outer member. The ridges are formed by a forging process and are smoothly connected to the outer circumferential surfaces of the plurality of ears. Inner-side side surfaces of the ridges and inner-side side surfaces of the plurality of ears are flattened by a cutting process. In this case, the strength and stiffness of the outer member is improved. The area of contact with the knuckle is ensured so that a pressure applied to the vehicle-body-mounting flange can be decreased.

Arc-shaped corners may be formed, by a forging process, where the plurality of ears and ridges of the outer member meet the outer circumferential surface on the outer side. The ribs of the plurality of ears may have a thickness larger than a thickness of the ridges. In this case, a stress applied to the corners between the ears and the outer circumferential surface can be decreased. In the case where a large moment load is applied to the outer member, the durability of the outer member can be increased.

Arc-shaped corners may be formed, by a forging process, where the plurality of ears and ridges of the outer member meet the outer circumferential surface on the outer side. The ribs of the plurality of ears may have a thickness less than a thickness of the ridges. In this case, a stress applied to the corners between the ridges and the outer circumferential surface can be decreased. The strength and stiffness of the outer member can be increased.

A wheel bearing device according to the present disclosure comprises an outer member including a vehicle-body-mounting flange that is integrally formed on an outer circumference. The flange is to be mounted to a knuckle of a suspension. Double-row outer raceway surfaces are integrally formed on an inner circumference of the outer member. An inner member outer circumference has double-row inner raceway surfaces that face the double-row outer raceway surfaces. Double-row rolling elements are rollably accommodated between the raceway surfaces of the inner member and the outer member. A plurality of tapped holes, to receive fastening bolts, is formed in the vehicle-body-mounting flange. The vehicle-body-mounting flange is formed with a plurality of ears. The ears are discontinuously formed in a circumferential direction of an outer circumferential surface of the outer member. The ears protrude toward the outside in a radial direction. The ears outer circumferential surface on the outer side is tapered and formed such that a diameter of the outer member gradually decreases in a direction to an outer side of the outer member. A cylindrical fitting surface, to be fit into the knuckle, is formed on an inner side of the outer member. The plurality of ears is interposed between the outer circumferential surface and the fitting surface. Ribs are formed, by a forging process, on inner-side outer circumferential surfaces of the plurality of ears. Accordingly, the weight of the outer member can be decreased without changing the length of the tapped holes and the area of contact between the inner-side side surface of the ears and the knuckle. The number of cutting processes is decreased to a minimum. Thus, the wheel bearing device can be provided at a reduced cost.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a longitudinal sectional view of a wheel bearing device according to an embodiment of the present disclosure.

FIG. 2 is a perspective view of an outer member as a single item illustrated in FIG. 1.

FIG. 3 is a longitudinal sectional view of a conventional wheel bearing device.

FIG. 4 is an enlarged view of main parts in FIG. 3 and illustrates a modification.

DETAILED DESCRIPTION

A wheel bearing device includes an outer member with a vehicle-body-mounting flange integrally formed on an outer circumference of the outer member. The flange is to be mounted to a knuckle of a suspension. Double-row outer raceway surfaces are integrally formed on an inner circumference of the outer member. An inner member includes a wheel hub with a wheel-mounting flange to mount a wheel. The wheel-mounting flange is integrally formed on an end portion of the wheel hub. An inner raceway surface on the wheel hub outer circumference faces one of the double-row outer raceway surfaces. A cylindrical portion extends from the inner raceway surface in an axial direction. An inner ring is press-fit on the cylindrical portion of the wheel hub. Another inner raceway surface, facing the other double-row outer raceway surface, is on an outer circumference of the inner ring. Double-row rolling elements are rollably accommodated between the raceway surfaces of the inner member and the outer member. A plurality of tapped holes, to receive fastening bolts, is formed in the vehicle-body-mounting flange. The vehicle-body-mounting flange is formed with a plurality of ears. The ears are discontinuously formed in a circumferential direction on an outer circumferential surface of the outer member. The ears protrude toward the outside in a radial direction. The outer circumferential surface on the outer side is tapered. A diameter of the outer member gradually decreases in a direction to an outer side of the outer member. A cylindrical fitting surface, to be fit into the knuckle, is formed on an inner side. The plurality of ears is interposed between the outer circumferential surface and the fitting surface. Ridges protrude from the fitting surface toward the outside in the radial direction. The ridges are formed between the plurality of ears. The ridges are formed by a forging process to be smoothly connected to the outer circumferential surfaces of the plurality of ears. Ribs are formed, by a forging process, on inner-side outer circumferential surfaces of the plurality of ears.

An embodiment of the present disclosure will now be described in detail with reference to the drawings. FIG. 1 is a longitudinal sectional view of a wheel bearing device according to an embodiment of the present disclosure. FIG. 2 is a perspective view of an outer member illustrated in FIG. 1. In the following description where the wheel bearing device is assembled with the vehicle, the outside of the vehicle is referred to as an outer side (left-hand side in FIG. 1). A central side of the vehicle is referred to as an inner side (right-hand side in FIG. 1).

The wheel bearing device illustrated in FIG. 1 is referred to as a third-generation wheel bearing device for a driven wheel. It includes an inner member 3, with a wheel hub 1 and an inner ring 2, and an outer member 5. The outer member 5 is mounted around the inner member 3 with double-row rolling elements (balls) 4 interposed between the two.

The wheel hub 1 includes a wheel-mounting flange 6 to mount a wheel (not illustrated). The wheel mounting flange 6 is integrally formed on an outer-side end portion. Hub bolts 6a are inserted in the wheel-mounting flange 6 at regular intervals about the circumference. An (outer-side) inner raceway surface 1a is formed on an outer circumference on the wheel hub 1. A cylindrical portion 1b axially extends from the inner raceway surface 1a. The inner ring 2 has another (inner-side) inner raceway surface 2a formed on its outer circumference. The inner ring 2 is press-fit onto the cylindrical portion 1b with a predetermined amount of interference. An end of the cylindrical portion 1b is plastically deformed radially toward the outside. This forms a caulked portion 1c. The caulked portion 1c enables fixation in the axial direction in a state where a bearing preload is applied. This forms a so-called self-retaining structure.

The outer member 5 is made of medium- or high-carbon steel containing 0.40 to 0.80 wt % carbon, such as S53C. It includes a vehicle-body-mounting flange 5b integrally formed on its outer circumference. The flange 5b is to be mounted to a knuckle (not illustrated) of a suspension. Double-row outer raceway surfaces 5a face the double-row inner raceway surfaces 1a and 2a. The outer raceway surfaces 5a are integrally formed on an inner circumference of the outer member. The outer raceway surfaces 5a are hardened in the range from 58 to 64 HRC by induction hardening. The double-row rolling elements 4 are rollably accommodated between the outer raceway surfaces 5a of the outer member 5 and the double-row inner raceway surfaces 1a and 2a that face the outer raceway surfaces 5a. The rolling elements 4 are retained by cages 7. Seals 8 and 9 are attached in openings forming an annular space between the outer member 5 and the inner member 3. The seals prevent lubricating grease sealed inside the bearing from leaking out. The seals prevent, for example, rainwater and dust from entering into the inside of the bearing from the outside.

The vehicle-body-mounting flange 5b of the outer member 5 is discontinuously formed in the circumferential direction on an outer circumferential surface. It is formed with ears 10 (here, four ears) protruding in the radial direction. The ears 10 each have a tapped hole 13, described later. The outer member 5 is to be fastened to the knuckle by using fastening bolts passing through the ears 10, not illustrated.

The wheel hub 1 is made of medium- or high-carbon steel containing 0.40 to 0.80 wt % carbon, such as S53C. Surfaces of portions ranging from a seal land portion, in sliding contact with the outer-side seal 8, to the cylindrical portion 1b, including the inner raceway surface 1a, are hardened in the range from 58 to 64 HRC by induction hardening. The caulked portion 1c is a non-hardened portion. It has a surface hardness of less than 25 HRC after forging. Thus, the stiffness of the wheel hub 1 is improved. Fretting wear of a fitting surface where the inner ring 2 fits onto the hub can be prevented. Thus, the durability of the wheel hub 1 is improved. Workability when the caulked portion 1c is plastically deformed is improved. Accordingly, the occurrence of cracks, for example, is prevented during the process. Thus, the reliability and quality is improved.

The inner ring 2 is made of high-carbon chromium bearing steel, such as SUJ2. It is hardened in the range from 58 to 64 HRC to its core by quenching, with coolant. The rolling elements 4 are made of high-carbon chromium bearing steel, such as SUJ2. They hardened in the range from 62 to 67 HRC to their core by quenching, with coolant.

The wheel bearing device described herein, by way of example, includes a double-row angular contact ball bearing that uses balls as the rolling elements 4. The wheel bearing device, however, is not limited and may include a double-row tapered roller bearing that uses tapered rollers as the rolling elements. According to the embodiment, a third-generation structure is described. The embodiment, however, is not limited and may be used, for example, on a second- or fourth-generation structure.

According to the embodiment, the outer member 5 has an outer circumferential surface 11. The surface 11 is tapered and formed such that the diameter of the outer member 5 gradually decreases in the direction to the outer side. A cylindrical fitting surface 12, to be fit into the knuckle, is formed on the inner side of the ears 10. The ears 10, forming the vehicle-body-mounting flange 5b, are interposed between the outer circumferential surface 11 and the fitting surface 12. An outer-side side surface 10a and an inner-side side surface 10b of the ears 10 are formed so as to be parallel to each other.

As illustrated in FIG. 2, ribs 15 are formed on the inner-side outer circumferential surface of the ears 10 (on the side of the fitting surface 12). Ridges 16 are formed between the ears 10. The ridges 16 protrude from the fitting surface 12. The ridges 16 are formed by a forging process to be smoothly connected to the outer circumferential surface of the ears 10. The ridges 16 enable the strength and stiffness of the outer member 5 to be improved. Also, they ensure the area of contact with the knuckle so that a pressure applied to the vehicle-body-mounting flange 5b can be decreased.

Large-arc-shaped corners 14 are formed by a forging process. They are formed at portions where the ears 10 meet the outer circumferential surface 11 on the outer side. Arc-shaped corners 17 are also formed by a forging process. They are formed at portions where the ridges 16 meet the outer circumferential surface 11 (see FIG. 1). An inner-side side surface 16a of the ridges 16 that comes in contact with the knuckle, and the inner-side side surface 10b of the ears 10 are flattened by a cutting process. The tapped holes 13 are formed through the ears 10. The outer member 5 is to be fastened to the knuckle in a manner where fastening bolts (not illustrated) are inserted into the tapped holes 13 from the side of the fitting surface 12.

The ribs 15 are formed on the inner-side outer circumferential surface of the ears 10, forming the vehicle-body-mounting flange 5b. The ridges 16 protrude from the fitting surface 12 and are formed between the ears 10, by a forging process. The weight of the outer member 5 can be decreased without changing the length of the tapped holes 13 and the contact area between the inner-side side surface 10b of the ears 10 and the knuckle. In other words, a desired outer diameter of the ears 10 can be maintained and the contact area with the knuckle can be ensured. An excess thickness of an outer circumferential portion of the ears 10 is decreased to a minimum by a forging process. Thus, the weight of the outer member 5 can be reduced. In addition, the number of cutting processes is decreased as much as possible. The wheel bearing device can be provided at a reduced cost.

Here, $W1 \geq W2$ holds. $W1$ represents the thickness of the ribs 15 of the ears 10. $W2$ represents the thickness of the ridges 16. This decreases a stress applied to the corners 14 between the ears 10 and the outer circumferential surface 11 in the case where a large moment load is applied to the outer member 5. Thus, the durability of the outer member 5 can be increased. In the case where $W1<W2$ holds, a stress applied to the corners 17 between the ridges 16 and the outer circumferential surface 11 can be decreased. Thus, the strength and stiffness of the outer member 5 can be increased.

A wheel bearing device according to the present disclosure can be used on any one of the wheel bearing devices having second- to fourth-generation structures that include a vehicle-body-mounting flange integrally formed on the outer circumference of the outer member forming the bearing and that is to be mounted to the knuckle.

Although the embodiment of the present disclosure is described above, the present disclosure is not limited to the embodiment, which is described by way of example. The present disclosure can be naturally carried out in various modes without departing from the spirit and scope of the present disclosure. The scope of the present disclosure is shown by claims and contains all modifications having the same content and scope as the claims or their equivalents.

What is claimed is:

1. A wheel bearing device, comprising:
    an outer member including a vehicle-body-mounting flange integrally formed on an outer circumference of the outer member, the vehicle-body-mounting flange is to be mounted to a knuckle of a suspension, double-row outer raceway surfaces are integrally formed on an inner circumference of the outer member;
    an inner member, the inner member including an outer circumference with double-row inner raceway surfaces facing the double-row outer raceway surfaces;
    double-row rolling elements are rollably accommodated between the raceway surfaces of the inner member and the outer member;
    a plurality of tapped holes, that receive fastening bolts, is formed in the vehicle-body-mounting flange; and
    a plurality of ears is formed on the vehicle-body-mounting flange, the plurality of ears is discontinuously formed in a circumferential direction on the outer circumferential surface of the outer member, the plurality of ears protrudes in a radial direction, the outer circumferential surface, on the outer side of the outer member, is tapered and formed such that a diameter of the outer member decreases axially in a direction to the outer side of the outer member;
    a cylindrical fitting surface is to be fit into the knuckle, the cylindrical fitting surface is formed on an inner side of the outer member;
    the plurality of ears is interposed between the outer circumferential surface and the fitting surface; and
    ribs are formed, by a forging process, on inner-side outer circumferential surfaces of the plurality of ears.

2. The wheel bearing device according to claim 1, wherein ridges are formed between the plurality of ears on the outer member, the ridges are formed by a forging process so as to be connected to the outer circumferential surfaces of the plurality of ears, and inner-side side surfaces of the ridges and inner-side side surfaces of the plurality of ears are flattened by a cutting process.

3. The wheel bearing device according to claim 2, wherein arc-shaped corners are formed by a forging process at portions where the plurality of ears and the ridges of the outer member meet the outer circumferential surface on the outer side, and the ribs of the plurality of ears have a thickness larger than a thickness of the ridges.

4. The wheel bearing device according to claim 2, wherein arc-shaped corners are formed by a forging process at portions where the plurality of ears and the ridges of the outer member meet the outer circumferential surface on the outer side, and the ribs of the plurality of ears have a thickness less than a thickness of the ridges.

\* \* \* \* \*